(12) United States Patent
Glasl et al.

(10) Patent No.: US 7,791,292 B2
(45) Date of Patent: Sep. 7, 2010

(54) VEHICLE COMPRISING A BATTERY DRIVE AND A METHOD FOR OPERATING A VEHICLE OF THIS TYPE

(75) Inventors: Markus Glasl, Unterradlberg (AT); Martin Dorninger, Vienna (AT); Gunther Jerabek, Vienna (AT); Matthias Eder, Vienna (AT); Andreas Trenner, Vienna (AT)

(73) Assignee: Elin EBG Traction GmbH (AT)

( * ) Notice: Subject to any disclaimer, the term of this patent is extended or adjusted under 35 U.S.C. 154(b) by 0 days.

(21) Appl. No.: 11/563,846

(22) Filed: Nov. 28, 2006

(65) Prior Publication Data

US 2007/0188127 A1    Aug. 16, 2007

Related U.S. Application Data

(63) Continuation-in-part of application No. 10/503,382, filed as application No. PCT/EP03/01029 on Feb. 3, 2003, now abandoned.

(30) Foreign Application Priority Data

Feb. 7, 2002    (AT) ................ A 199/2002

(51) Int. Cl.
  H02P 1/00    (2006.01)
  B60L 1/00    (2006.01)
  B60L 9/00    (2006.01)
(52) U.S. Cl. ................ 318/139; 191/2; 191/3; 191/4; 191/5; 191/8
(58) Field of Classification Search ............... 191/1–5, 191/8; 318/139
  See application file for complete search history.

(56) References Cited

U.S. PATENT DOCUMENTS

| 894,333 | A | * | 7/1908 | Ledwinka | 191/4 |
| 1,722,582 | A | * | 7/1929 | Kloss | 191/6 |
| 2,345,149 | A | | 3/1944 | Purifoy | 307/38 |
| 2,812,617 | A | * | 11/1957 | Longarzo | 446/439 |
| 2,826,705 | A | | 3/1958 | Lichtenfels et al. | 307/9.1 |
| 3,637,956 | A | * | 1/1972 | Blackman | 191/4 |
| 3,853,174 | A | | 12/1974 | Kramer | 165/287 |
| 3,955,657 | A | * | 5/1976 | Bossi | 191/2 |

(Continued)

FOREIGN PATENT DOCUMENTS

DE    30 29 216    2/1982

(Continued)

OTHER PUBLICATIONS

Elin EBG Traction, viewed Feb. 1, 2008.*

(Continued)

*Primary Examiner*—Elvin G Enad
*Assistant Examiner*—Robert W Horn
(74) *Attorney, Agent, or Firm*—Ostrolenk Faber LLP

(57) ABSTRACT

Electrically driven passenger transport vehicles are supplied with energy by an external electric supply network. If the external energy supply fails, vehicles of this type require special auxiliary devices that do not rely on the supply network, for example rely on auxiliary vehicles, in order to move said vehicles again. A vehicle can move independently during a failure of the external energy supply, by switching the electric drive of said vehicle to a battery drive.

13 Claims, 2 Drawing Sheets

U.S. PATENT DOCUMENTS

| | | | | |
|---|---|---|---|---|
| 4,087,734 A | | 5/1978 | Blutreich | 320/149 |
| 4,091,319 A | | 5/1978 | Nguyen | 320/140 |
| 4,139,071 A | | 2/1979 | Tackett | 180/165 |
| RE29,994 E | * | 5/1979 | Bossi | 191/2 |
| 4,301,899 A | | 11/1981 | McSparran et al. | 191/3 |
| 4,335,337 A | | 6/1982 | Okamatsu et al. | 318/52 |
| 4,357,501 A | | 11/1982 | Clerc | 191/83 |
| 4,388,977 A | | 6/1983 | Bader | 180/165 |
| 4,465,943 A | | 8/1984 | Risberg | 307/67 |
| 4,476,947 A | | 10/1984 | Rynbrandt | 180/2.1 |
| 4,480,298 A | | 10/1984 | Fry | 363/28 |
| 4,731,723 A | | 3/1988 | Nogi et al. | 363/70 |
| 4,795,859 A | | 1/1989 | Kato et al. | 191/4 |
| 4,800,328 A | | 1/1989 | Bolger | 320/106 |
| 5,021,727 A | | 6/1991 | Mashino | 322/7 |
| 5,103,823 A | | 4/1992 | Acharya et al. | 180/65.2 |
| 5,148,898 A | | 9/1992 | Musachio | 191/6 |
| 5,175,439 A | | 12/1992 | Harer et al. | 307/10.1 |
| 5,198,698 A | | 3/1993 | Paul et al. | 307/64 |
| 5,293,947 A | | 3/1994 | Stratton | 180/2.1 |
| 5,298,849 A | * | 3/1994 | Drexel et al. | 320/109 |
| 5,369,540 A | | 11/1994 | Konrad et al. | 361/6 |
| 5,463,294 A | | 10/1995 | Valdivia et al. | 318/432 |
| 5,464,082 A | | 11/1995 | Young | 191/2 |
| 5,510,658 A | | 4/1996 | Nakayama | 307/10.1 |
| 5,569,966 A | | 10/1996 | Schantz, Jr. et al. | 307/10.1 |
| 5,629,591 A | | 5/1997 | Thevenon | 318/107 |
| 5,629,592 A | | 5/1997 | Henmi | 318/107 |
| 5,644,212 A | | 7/1997 | Takahashi | 320/134 |
| 5,651,434 A | * | 7/1997 | Saunders | 191/2 |
| 5,701,068 A | | 12/1997 | Baer et al. | 320/119 |
| 5,736,831 A | * | 4/1998 | Harrington | 320/104 |
| 5,796,175 A | | 8/1998 | Itoh et al. | 307/10.1 |
| 5,831,409 A | | 11/1998 | Lindberg et al. | 318/801 |
| 5,867,005 A | | 2/1999 | Brown | 318/751 |
| 5,971,090 A | | 10/1999 | Tanaka et al. | 180/205 |
| 5,998,884 A | | 12/1999 | Kitamine et al. | 307/10.1 |
| 6,075,346 A | | 6/2000 | Kikuchi et al. | 320/150 |
| 6,097,181 A | | 8/2000 | Russo | 323/360 |
| 6,151,222 A | | 11/2000 | Barrett | 363/16 |
| 6,191,558 B1 | | 2/2001 | Arai et al. | 320/132 |
| 6,323,608 B1 | | 11/2001 | Ozawa | 318/139 |
| 6,333,570 B1 | | 12/2001 | Ilg | 307/75 |
| 6,384,489 B1 | | 5/2002 | Bluemel et al. | 307/10.1 |
| 6,424,135 B1 | | 7/2002 | Russo | 323/360 |
| 6,441,581 B1 | | 8/2002 | King et al. | 320/101 |
| 6,455,949 B1 | | 9/2002 | Blauensteiner et al. | 307/10.1 |
| 6,483,272 B1 | | 11/2002 | Terada et al. | 320/103 |
| 6,522,960 B2 | | 2/2003 | Nada | 701/22 |
| 6,557,476 B2 | | 5/2003 | Batisse | 104/289 |
| 6,573,688 B2 | | 6/2003 | Nakanishi | 320/135 |
| 6,608,396 B2 | | 8/2003 | Downer et al. | 290/40 C |
| 6,612,246 B2 | | 9/2003 | Kumar | 105/34.2 |
| 6,615,118 B2 | | 9/2003 | Kumar | 701/19 |
| 6,642,679 B2 | | 11/2003 | Nagatake et al. | 318/139 |
| 6,693,403 B2 | | 2/2004 | Chen | 318/701 |
| 6,737,762 B2 | | 5/2004 | Koenig | 307/48 |
| 6,794,836 B2 | | 9/2004 | Strothmann et al. | 318/268 |
| 6,909,287 B2 | | 6/2005 | Bertness | 324/427 |
| 6,953,100 B2 | * | 10/2005 | Aberle et al. | 180/65.3 |
| 2002/0139629 A1 | * | 10/2002 | Nogaret et al. | 191/2 |
| 2003/0169001 A1 | * | 9/2003 | Murakami et al. | 318/139 |
| 2008/0169776 A1 | * | 7/2008 | Acker | 318/139 |
| 2009/0101419 A1 | * | 4/2009 | Okayama et al. | 180/65.8 |

FOREIGN PATENT DOCUMENTS

| | | |
|---|---|---|
| EP | 0 386 812 | 2/1990 |
| EP | 386812 | 9/1999 |
| JP | 59-106803 | 6/1984 |
| WO | WO 93/04887 | 3/1993 |
| WO | WO 00/77918 | 12/2000 |

OTHER PUBLICATIONS

Vossloh Electrical Equipment, Electrical Equipment for Low Floor Tramcar . . . Krakow, col. 2, vehicles delivered 1999/2000, pdf document dated Oct. 2003, found at www.vossloh-kiepe.com Others: Vossloh, . . . Wiener Stadtwerke, delivered 1992 and 1999, battery voltage 24; Vossloh, . . . Verkehrs-Gesellschaft AG, delivered 1999 and 2000, battery voltage 24 V.

Caricchi, F. et al., Experimental Study of Bidirectional DC-DC Converter . . . Electrical Vehicles IEEE, Applied Power Electronics Conference and Exposition, 1994, published, Feb. 13-17, 1994.

Kerkman, J., "Twenty Years of PWM AC Drives," IEEE, Industrial Electronics, Control and Instrumentation Proceedings, 1996, published Aug. 5-10, 1996.

Hamada, Hironobu, Trolley Bus Driving Device, Apr. 10, 1987, JP 62-077804, translated by FLS, Inc. for the U.S. Patent Office.

* cited by examiner

VEHICLE COMPRISING A BATTERY DRIVE AND A METHOD FOR OPERATING A VEHICLE OF THIS TYPE

CROSS-REFERENCE TO RELATED APPLICATIONS

This application is a continuation-in-part of U.S. patent application Ser. No. 10/503,382, filed Sep. 29, 2004, which is a 35 U.S.C. §§371 national phase conversion of PCT/EP03/01029, filed Feb. 3, 2003, which claims priority of Austrian Patent Application No. A 199/2002, filed Feb. 7, 2002.

BACKGROUND OF THE INVENTION

1. Field of the Invention

The present invention relates to a vehicle having an electric drive which is supplied by an external electric supply system, and at least one battery, a method for operating such a vehicle, and a method for retrofitting a vehicle with an electric drive which is supplied by an external electric supply system.

2. Relevant Art

Urban local and regional passenger transportation vehicles such as trams or trolley buses generally do not travel on separate roadways but instead are operated together with the individual vehicular traffic, i.e., automobiles, on the same roadway, generally a road. These public transportation vehicles are usually electrically driven and supplied with electric power via contact lines, for example, overhead lines. When there is a power outage, due, for example, to a rupture of a power line or a defective current collector, etc., there is the considerable risk of the traffic being impeded since the public transportation vehicle can no longer move independently, which is very critical in urban situations and can result in considerable financial loss as a result of congestion of individual vehicular traffic.

The fact that such vehicles conventionally cannot be operated independently without an external power supply, can lead to other problems in certain situations, for example, starting up when the vehicle happens to be stationary with its current collectors under section isolators, in addition to when there is a power failure. It is also impossible to carry out voltageless shunting movements in the depot. In that situation, expensive auxiliary vehicles have always been necessary.

One known solution to this problem are so-called hybrid vehicles which are capable of being driven by an external electric supply, and have an additional power supply such as a diesel powered electric generator which can be used to supply the drive of the vehicle when necessary. These, however, are respectively fully functional power supply systems or a fully functional drive with which the vehicle can be moved at least over a certain time period without limiting the load or speed. Such a vehicle is known, for example, from WO 93/04887 A1 and WO 00/77918 A1. Since the power supply systems in these vehicles have to be at least approximately equivalent, they of course also have to be given equivalent dimensions, which increases the costs for the backup drive, and thus for the vehicle.

Vehicles of the type in question generally carry on-board battery systems used to supply the fundamental control functions of the vehicle, such as, for example, the general control system, the raising and lowering of the current collector, the vehicle lighting system, etc. It would be particularly advantageous if this battery system could also be used to provide emergency traction power when necessary. However, the voltage of the on-board battery system is very much lower than the external traction supply voltage, e.g., 24 Volts compared to 600 Volts. Up to now, a practical way of using the on-board battery system for emergency traction power has not been known.

SUMMARY OF THE INVENTION

The present invention is therefore based on the object of specifying a vehicle which can be moved independently by means of an auxiliary supply system, without additional external drives, both in the normal operating mode, that is to say while the vehicle is being supplied via an external electric supply system, and when the external supply system fails.

The vehicle and method according to the invention are characterized in that the electric drive is supplied by the on-board battery system when the external electric supply system is disconnected or fails, or where an external supply is not available, the supply voltage of the battery being at maximum 25%, preferably less than 10%, of the external supply system voltage. This ensures that when the external supply is disconnected the vehicle can be moved independently, even without additional auxiliary vehicles or without an additional auxiliary drive. In particular, significantly fewer auxiliary vehicles which are independent of contact lines are necessary, which considerably reduces the costs for the operator of the vehicles.

It has been found in practice according to the present invention that using the on-board battery for emergency traction power, approximately 30% of the normal traction force can be achieved, which is at any rate sufficient to accelerate somewhat from a standstill a typical tram vehicle having a weight of several tons, for example approximately 45 t, and to move it along at a slow speed, adequate under the circumstances.

This vehicle according to the invention can be implemented almost exclusively with the already existing standard components, as a result of which the technical implementation is easy and the additional costs are negligible.

Furthermore, inexpensive standard batteries, for example with a rated voltage of 24 V, can thus be used.

It is especially advantageous if the battery which is provided for supplying the on-board supply system of the vehicle, for example the electronic control system of the vehicle, etc., in the normal operating mode is used for supplying the electric drive. Any vehicle generally has an on-board battery which is used to supply the fundamental control functions of the vehicle, such as, for example, the general control system, the raising and lowering of the current collector, the vehicle lighting system, etc. This existing battery can then be used directly as a supply for the electric drive without providing additional further batteries.

If at least one circuit breaker is provided by means of which the electric drive can be disconnected from the external electric supply system and connected to the battery, the switching-over from the external power supply to the battery supply can be carried out particularly easily.

According to conventional practice, the electric drives for such vehicles include a power unit, in particular a power inverter, and an electric motor, in particular an asynchronous motor. Such an arrangement is readily usable according to the present invention. When the supply voltage needs to be changed, all that is necessary is to actuate the power inverter differently, everything else can remain unchanged.

When the electric supply of the drive is changed, the electric relationships of the electric drive, which are advantageously taken into account by means of a control unit for actuating the electric drive, change. A battery (for example with a 24 V rated voltage) generally has a significantly lower available voltage than an electric supply system (for example a 600 V supply system). As a result, the voltage drops at the semiconductors such as diodes and transistors of the power unit, as well as offset faults in the measurement of the voltage in the intermediate circuit of the power unit, have to be taken into account in order to obtain the magnetic flux which is necessary for the drive.

In particular, the control system according to the present invention operates the inverter to compensate for the inherent losses in the semiconductor components of the power inverter. These losses are not significant at the normal traction voltage. However, at the very greatly reduced voltage of the on-board battery system, without proper compensation, there would not be sufficient magnetization current for the traction motors. According to the present invention, the control system is capable of ensuring the optimum magnetization, even under completely changed electrical conditions.

The use of the stored power which is available in the battery is advantageously optimized by means of a battery management unit. This optimization is favorably carried out with respect to a power limiting means, ensuring that the permitted battery current is not exceeded, and/or a set point torque limiting means, ensuring both traction up to the point where the battery is exhausted, and residual availability of the control voltage at the vehicle. It is in this case also necessary to take into account the fact that as a result of the internal voltage drop of the battery a severe reaction of the battery current on the voltage of the electric motor occurs ("soft" voltage supply in contrast to the relatively rigid external electric supply system) which is also dependent on the charge state of the battery. As a result, the dynamics of the drive change.

The method for retrofitting a vehicle with an electric drive is characterized in that a circuit breaker is installed which is connected, on the one hand, to at least one battery which is present or, if appropriate, to be retrofitted, and, on the other hand, to the power unit, for example a power inverter, of the electric drive, and the control unit is replaced or updated as necessary. Furthermore, a separate battery management unit is advantageously installed in order to be able to use the battery in an optimum way, it being also possible to integrate this battery management unit into the control unit.

Since, for the most part, except for the circuit breaker, only already present components of the vehicle are used, existing vehicles can also be retrofitted without a large degree of effort. As a rule, only one switch has to be installed and the control software and/or hardware updated in order to be able to cover even the failure of the supply to the drive via the batteries.

BRIEF DESCRIPTION OF THE DRAWINGS

Additional features and advantages of the present invention will be apparent from the following description with reference to the accompanying exemplary drawings which are not restrictive and which show a specific exemplary embodiment.

DETAILED DESCRIPTION OF THE INVENTION

Figure 1:
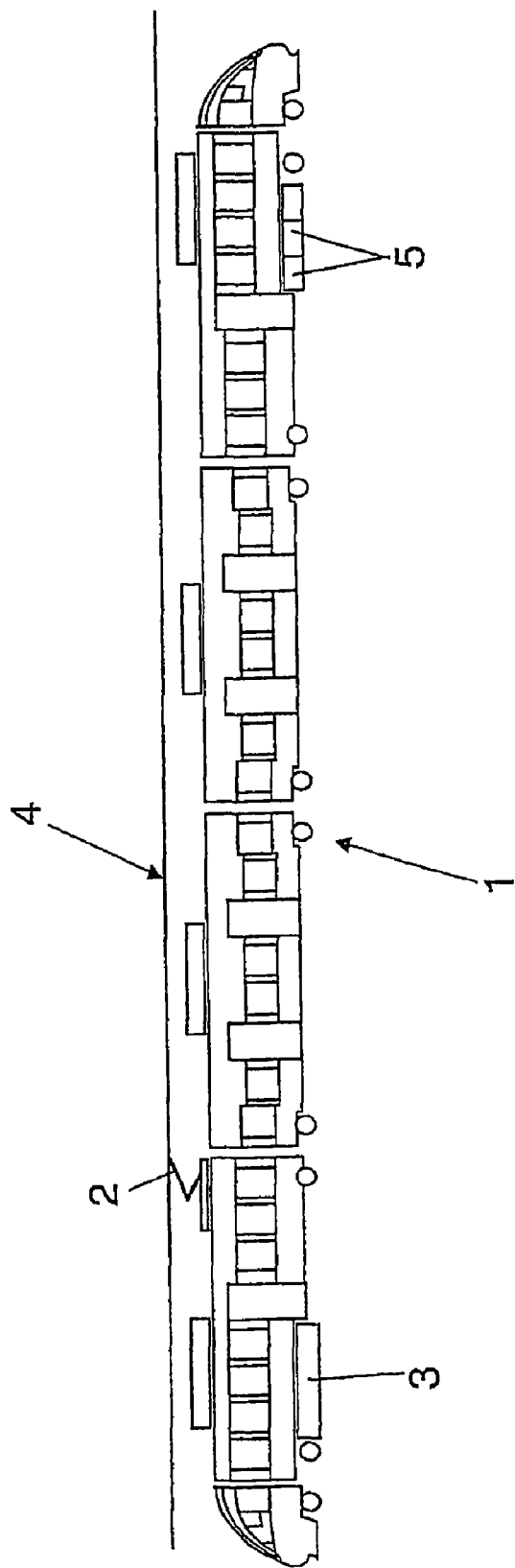
FIG. 1 is a schematic illustration of a vehicle according to the invention.
Figure 2:
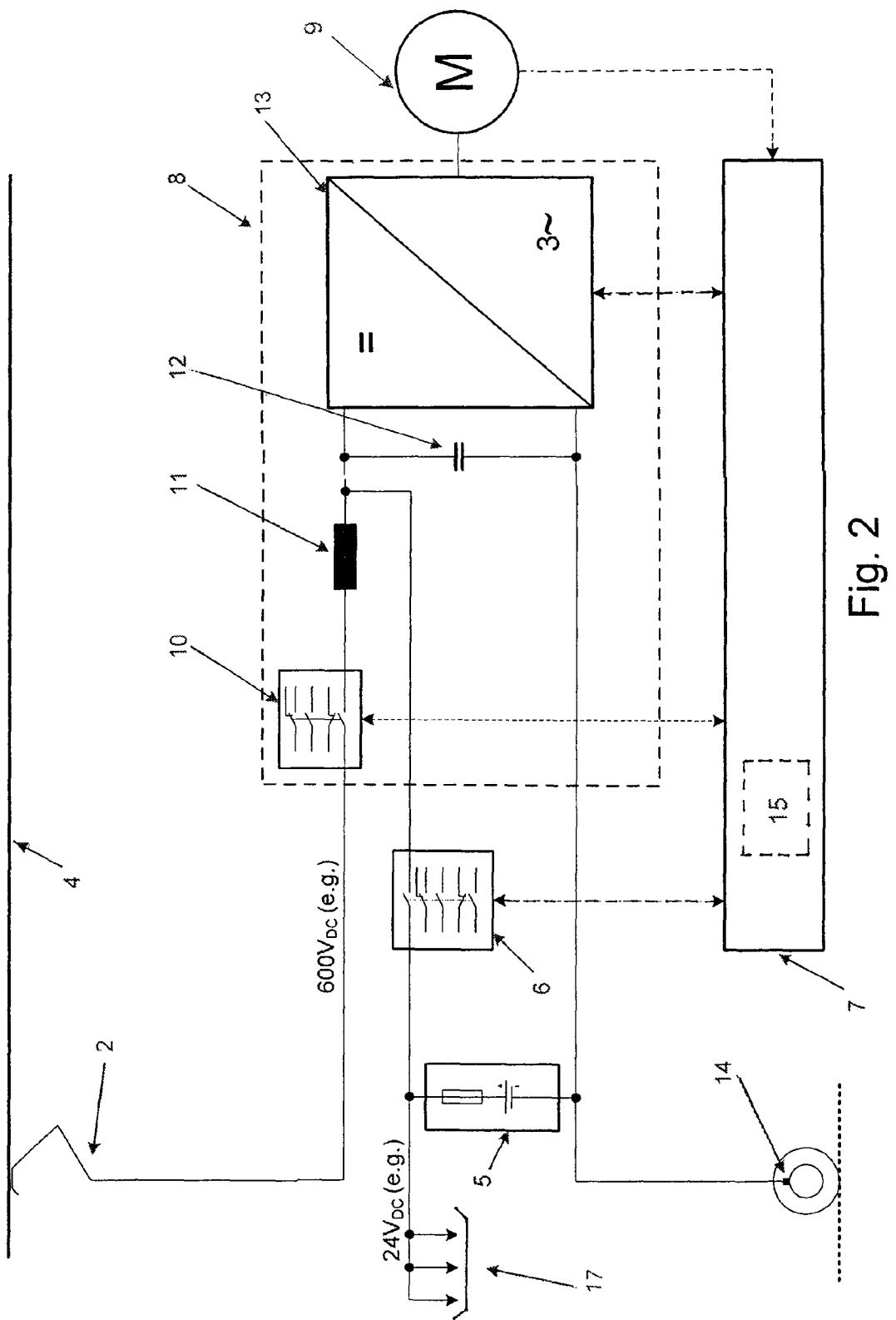
FIG. 2 is a schematic circuit diagram of the electric drive of the vehicle.

An electrically driven vehicle 1 according to FIG. 1, here a tram, is supplied with electric power via an overhead line 4 by means of an external electric supply system, here a 600 Volt supply system, (not illustrated in more detail). The electric power is tapped in a conventional manner by means of a current collector 2. Referring to FIG. 2, the electric drive 3 in this configuration is comprised of, for example, an electric motor 9, here an asynchronous motor, and may also, if necessary, contain a transmission as well as a power inverter 13 as a power unit 8 which supplies drive power for the electric motor 9. A control unit 7 controls the entire electric drive 3.

Power unit 8 is comprised of a power inverter 13 which is connected to an intermediate circuit capacitor 12 and to the external supply system via a main contactor 10 and a supply system reactor 11. The grounding is carried out in this example by means of a grounding earth contact 14.

Power inverter 13 may be of any conventional or desired type, such as a switched rectifier, pulse width modulation (PWM) drive unit having one or more stages of power transistors such as IGBTS or MOSFETS feeding the motor in common.

A conventional on-board supply system comprising one or more batteries 5, here 24 Volt batteries, supplies important parts of the vehicle 1 such as the electronic control system or the basic lighting system of the vehicle 1, etc. (collectively, 17), with electric power independently of the external supply system.

The vehicle 1 which is described above is, of course, only to be considered as an example. In particular, the individual components can be arranged at any other desired locations on the vehicle 1, for example, instead of overhead lines 4 it would also be possible to provide lateral sliding contacts, and the individual components can of course also be provided multiply, for example, a vehicle 1 can be provided with two drives 3. In many embodiment variants the drive 3 is also accommodated directly in the chassis of the vehicle 1.

In the normal operating mode, the electric drive 3 of the vehicle 1 is supplied with electric power by the external electric supply system. Generally, the batteries 5 only supply the electronic control system and other components of the vehicle 1 here, and are recharged via the external electric supply system when necessary.

If the external supply system fails, for example owing to a line break or a power failure, or if the vehicle 1 is to be operated in an area without an external supply system, for example in a depot, it has been necessary in the past, for auxiliary vehicles which are independent of a contact line to be used to move the vehicle.

According to the present invention, however, as illustrated in FIG. 2, a circuit breaker 6 is provided which, is closed (either manually, or automatically by control unit 7 in response to loss of external power) to connect control unit 7 and power inverter 13 of the electric drive 3 to the on-board supply system batteries 5. In conjunction with this, the main contactor 10 which connects the external power supply to power unit 8, is opened by control unit 7, and vehicle 1 is disconnected from the external supply system. Both traction power and conventional on-board function power are supplied by the already present on-board supply system batteries 5.

However, as a result of the significantly lower supply voltage, here 24 V instead of 600 V, for which the drive 3 is configured, completely different electrical conditions arise. For example, as well known to those skilled in the art of designing switched rectifier motor drives, parasitic effects inherent in the semiconductor devices which comprise the motor drive unit 13 cause losses, which effectively reduce the power available to drive motor 9. These effects are taken into account and compensated for in the design of the drive unit itself, and by the operation of control unit 7. Nevertheless, these come to bear dramatically when the traction power is supplied by on-board battery system.

Consider, for example the following: If the external voltage supply provides, e.g., 600 Volts, and a certain element of power inverter 13, such as a power transistor or a diode, experiences a voltage drop of 2 Volts, the reduction of the drive voltage to 598 Volts will have negligible influence on the magnetic field of traction motor 9.

If traction power for the vehicle needs to be supplied by the on-board 24 Volt system supply battery, a voltage drop of 2 Volts is a drop of 10% in the supply Voltage, which can not be ignored anymore. The consequent reduction in motor current will have a dramatic effect on the torque produced by the motor, effectively rendering it incapable of providing traction power.

According to the principles of the present invention, the lost current is compensated for by increasing the pulse width (duty cycle) of the PWM drive for the inverter. This permits motor 9 to be run on power provided by the onboard battery. The motor speed will, of course, be considerably lower than under normal conditions, but will be sufficient for emergency purposes, or limited travel in a depot where external power is not available.

As will be understood by those skilled in the art, complete specification of the performance of the inverter 13 and controller 7 with both external and on-board battery power can, in general, be quite complex. Considerable simplification could be achieved if the required compensation could be determined on the basis of transistor and diode models alone. Fortunately, over a range of input voltages encountered, it has been found that these models can be used to determine the voltage drops that have to be compensated by the control unit.

Stated differently, a person skilled in the art will readily be able to apply conventional design practice to controller 7 such that it will be operable to adjust the duty cycle for the PWM switched power supply to provide adequate magnetization current for motor 9 when traction power is supplied by the on-board battery system on the basis of standard transistor a diode models. It will similarly be appreciated by those skilled in the art, that numerous circuit designs can be implemented which will achieve the stated objective within the scope of the invention.

A person skilled in the art will also recognize that other features can also be provided. For example, a separate battery management unit 15, which could also be the control unit 7, can be provided since the batteries 5 have only a restricted amount of power which should be utilized in an optimum way.

For this purpose, on the one hand, a power limiting means could be provided since each battery should be loaded only with a specific maximum battery current, and in order to prevent the battery 5 becoming exhausted, and on the other hand, a maximum drive torque is to be obtained. The battery management system ensures both traction to the point where the battery 5 is exhausted and residual availability of the control voltage at the vehicle 1.

It is, of course, conceivable to use any desired number of the present on-board supply system batteries 5 to supply the electric drive 3, or else to equip a plurality of drives 3 of the vehicle 1 in this way.

In this specific exemplary embodiment, the power unit 8 has been described as comprised of a power inverter 13 which is connected to an intermediate circuit capacitor 12 and to the external supply system via a main contactor 10 and a supply system reactor 11. In the event of a failure, the main contactor 10 is opened by means of the control-unit 7, and the circuit breaker 6 is closed, as a result of which the power unit 8 is thus supplied by the battery 5. The grounding is carried out in this example by means of a grounding earth contact 14.

However, basically, any desired other circuits are also possible, for example a two-pole embodiment of the circuit breaker 6 if the battery circuit is grounded differently, or the use of some other power unit 8 in which the main contactor 10 and supply system reactor 11 are not integrated in the power converter, etc.

Although the present invention has been described in relation to a particular embodiment thereof, many other variations and modifications and other uses will become apparent to those skilled in the art. It is intended, therefore, that the present invention is not be limited by the specific disclosure herein, but is to be given the full scope permitted by the appended claims.

What is claimed is:

1. A vehicle comprising:
   an electric drive adapted to receive operating power from an external electric supply system,
   a battery located on-board the vehicle, the battery having a rated voltage which is less than or equal to 10% of voltage of the external electric supply system; and
   a control unit for actuating the electric drive; wherein
   the electric drive is configured and operative to operate with the voltage of the external electric supply system and can be supplied by and is configured to be operated by the battery when the external electric supply system is disconnected or fails,
   the battery being configured and operative for supplying an on-board electrical supply system of the vehicle for functions other than traction in a normal operating mode of the electric drive, during which the drive is being supplied by an external electric supply system,
   the electric drive comprises a power unit, and an electric motor connected to the power unit, and the power unit comprises a switched rectifier power inverter controlled by a PWM driver, and
   the control unit being configured and operative to compensate voltage drops delivered to the motor when the electric drive is operated by the battery by adjusting the PWM duty cycle to increase the current output of the switched rectifier power inverter.

2. The vehicle as claimed in claim 1 further comprising at least one circuit breaker connected to the electric drive, to the external electric supply system and to the battery, the circuit breaker being operable to disconnect the electric drive from the external electric supply system and to connect it to the battery, and vice versa.

3. The vehicle as claimed in claim 1, wherein the electric motor is an asynchronous motor.

4. A vehicle as claimed in claim 1, wherein the electric drive is operable by a 600V supply system and the battery has a 24V rated voltage.

5. The vehicle as claimed in claim 1, wherein the switched rectifier power inverter comprises operative semiconductor components, and
   the control unit operates the switched rectifier power inverter to compensate for the inherent losses in the semiconductor components of the switched rectifier power inverter when the electric drive is operated by the battery.

6. A method for operating a vehicle having an electric drive which is adapted to receive operating power from an external electric supply system and which is configured with respect to the voltage of the external electric supply system wherein the electric drive comprises an electric motor coupled to drive the vehicle, and a power unit including a switched rectifier power inverter controlled by a PWM driver which provides power to, and controls the motor, the method comprising:

connecting the power unit to the external electric supply system to provide operating power for the motor during a normal operating mode for the electric drive;

switching the electric drive over to an on-board battery operating mode when the external electric supply system is disconnected or fails, wherein the voltage of the battery is less than or equal to 10% of the external supply system voltage, and the battery supplies power for an on-board electrical supply system of the vehicle in the normal operating mode;

adjusting the electric drive to compensate voltage drops delivered to the motor when the power unit is supplied by the battery by adjusting the PWM duty cycle to increase the current output of the switched rectifier power inverter; and operating the adjusted electric drive on the battery voltage.

7. The method as claimed in claim 6, further comprising optimizing use of stored power available in the battery.

8. The method as claimed in claim 7, wherein the power which is extracted from the battery is limited and use of the limited power is optimized.

9. The method as claimed in claim 7, further comprising limiting a setpoint torque of the electric motor of the electric drive.

10. A method as claimed in claim 7, wherein the use of the stored power available to the battery is optimized with respect to power utilization by the electric drive.

11. A method as claimed in claim 6, wherein the on-board supply system is an electronic control system of the vehicle.

12. A method for retrofitting a vehicle having an electric drive which is adapted to receive operating power from an external electric supply system, the method comprising:

providing a battery on the vehicle having a rated voltage which is less than or equal to 10% of voltage of the external electric supply system, if one is not already present, the battery being configured and operative for supplying an on-board electrical supply system of the vehicle in a normal operating mode of the electric drive, in which mode the electric drive is supplied by an external electric supply system;

connecting a circuit breaker located on the vehicle to selectably provide power from the battery to a power unit of the electric drive, wherein the power unit comprises a switched rectifier power inverter controlled by a PWM driver; and replacing or updating a control unit for actuating the power unit of the electric drive to compensate voltage drops delivered to the motor when the electric drive is operated by the battery by adjusting the PWM duty cycle to increase the current output of the switched rectifier power inverter.

13. The method as claimed in claim 12, further comprising installing a battery management unit which optimizes the use of the battery.

* * * * *